(12) United States Patent
Bernstein et al.

(10) Patent No.: US 11,734,766 B1
(45) Date of Patent: *Aug. 22, 2023

(54) TELEMATICS DEVICES AND RIDESHARING

(71) Applicant: Liberty Mutual Insurance Company, Boston, MA (US)

(72) Inventors: Daniel Carey Bernstein, Boston, MA (US); Christopher Tassone, Boston, MA (US); Nicholas Grant, Boston, MA (US)

(73) Assignee: LIBERTY MUTUAL INSURANCE COMPANY, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/871,086

(22) Filed: May 11, 2020

Related U.S. Application Data

(63) Continuation of application No. 14/958,584, filed on Dec. 3, 2015, now Pat. No. 10,733,672.

(60) Provisional application No. 62/087,066, filed on Dec. 3, 2014.

(51) Int. Cl.
| | | |
|---|---|---|
| *G06Q 40/00* | (2023.01) | |
| *G06Q 40/08* | (2012.01) | |
| *G07C 5/08* | (2006.01) | |
| *G01C 21/34* | (2006.01) | |
| *G07C 5/00* | (2006.01) | |

(52) U.S. Cl.
CPC .......... *G06Q 40/08* (2013.01); *G01C 21/3438* (2013.01); *G07C 5/008* (2013.01); *G07C 5/0841* (2013.01)

(58) Field of Classification Search
CPC .......................... G06Q 40/08; G06Q 10/0639
See application file for complete search history.

(56) References Cited

U.S. PATENT DOCUMENTS

| | | | | |
|---|---|---|---|---|
| 8,140,358 | B1* | 3/2012 | Ling et al. | G07C 5/008 340/439 |
| 8,731,977 | B1* | 5/2014 | Hardin et al. | G06Q 40/08 705/26.1 |
| 2004/0158483 | A1 | 8/2004 | Lecouturier | |
| 2008/0270019 | A1 | 10/2008 | Anderson et al. | |
| 2008/0277183 | A1 | 11/2008 | Huang et al. | |
| 2009/0150023 | A1 | 6/2009 | Grau et al. | |

(Continued)

OTHER PUBLICATIONS

Litman, Todd. "Distance-Based Vehicle Insurance Feasibility, Costs and Benefits," Jun. 8, 2011, (90 pages). [ from the Internet May 21, 2020] <https://www.vtpi.org/dbvi_com.pdf>.
United States Patent and Trademark Office, Final Office Action for U.S. Appl. No. 14/958,584, Nov. 13, 2018, (15 pages), USA.
United States Patent and Trademark Office, NonFinal Office Action for U.S. Appl. No. 14/958,584, May 25, 2018, (19 pages), USA.

(Continued)

*Primary Examiner* — Eric T Wong
*Assistant Examiner* — Mark H Gaw
(74) *Attorney, Agent, or Firm* — ALSTON & BIRD LLP

(57) ABSTRACT

A system is engineered to facilitate calculation of predicted perils connected with a ridesharing vehicle. The system facilitates premium endorsement that provides higher coverage than is provided under conventional products and allows drivers to work directly with their personal lines insurer in reviewing their coverage and filing a claim in the event of an accident. The subject matter facilitates higher limits while including a post-policy period audit that allows a reconciliation of high-use or high-risk driving with appropriate retroactive rate adjustments. The system also facilitates retroactive rate adjustments that would compare a policyholder's time/distance driven or collected telematics data (including time or distance driven in each driving period) to the group average or other historical underwriting data.

20 Claims, 9 Drawing Sheets

(56) References Cited

U.S. PATENT DOCUMENTS

| | | |
|---|---|---|
| 2011/0213629 A1 | 9/2011 | Clark et al. |
| 2013/0046510 A1* | 2/2013 | Bowne et al. ..... G06Q 10/0639 |
| | | 702/187 |
| 2013/0141247 A1* | 6/2013 | Ricci .................... G06Q 50/26 |
| | | 340/870.01 |
| 2013/0179198 A1* | 7/2013 | Bowne et al. ........... G07C 5/08 |
| | | 705/4 |
| 2014/0222469 A1 | 8/2014 | Stahl et al. |
| 2014/0358896 A1 | 12/2014 | Camacho et al. |

OTHER PUBLICATIONS

United States Patent and Trademark Office, NonFinal Office Action for U.S. Appl. No. 14/958,584, Nov. 20, 2019, (20 pages), USA.
United States Patent and Trademark Office, Notice of Allowance, for U.S. Appl. No. 14/958,584, Apr. 1, 2020, (24 pages), USA.
Litman, Todd (Distance-Based Vehicle Insurance Feasibility, Costs and Benefits, Jun. 2011) (Year: 2011).*

* cited by examiner

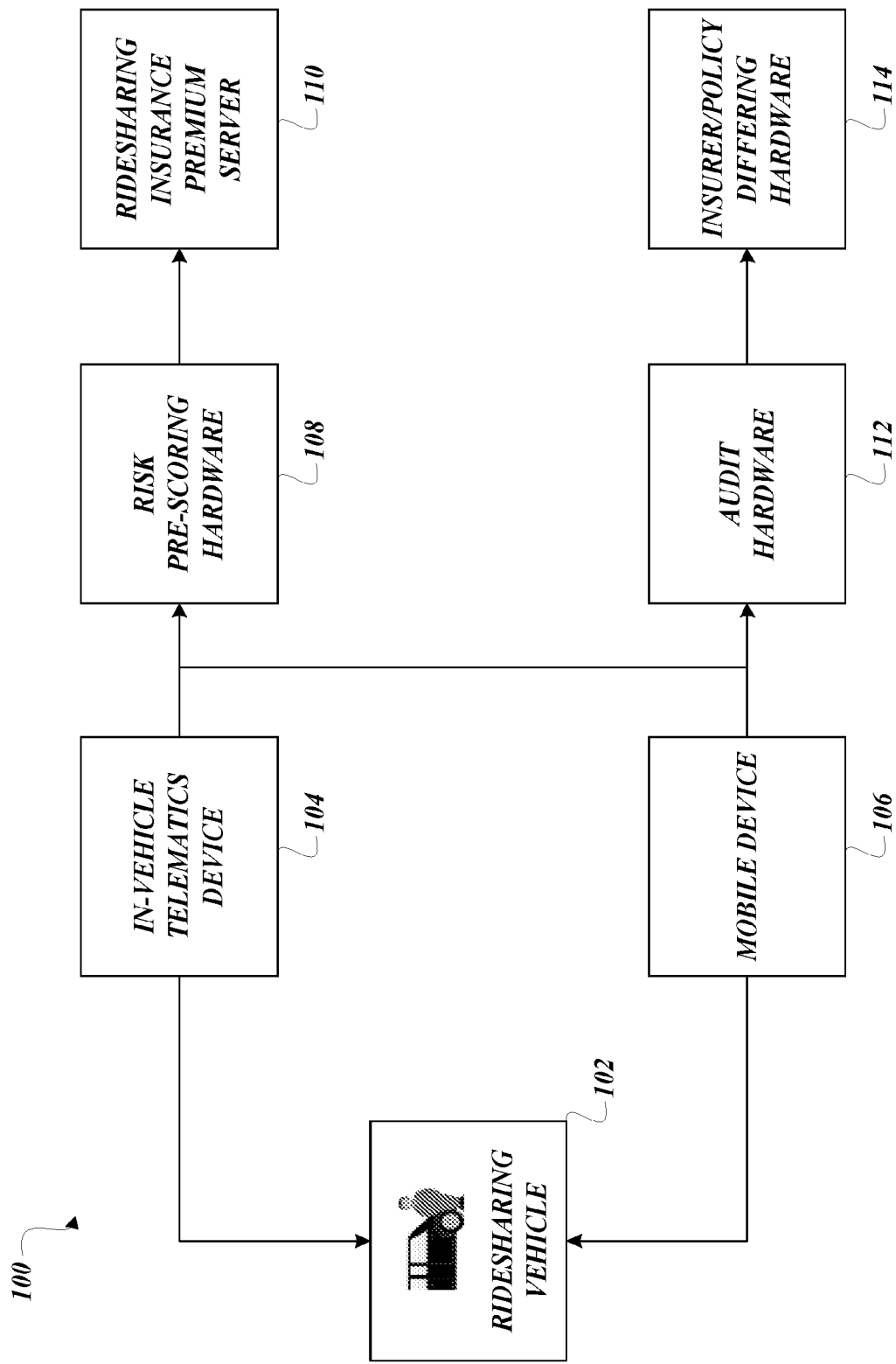

TELEMATICS DEVICES AND RIDESHARING

CROSS REFERENCE TO RELATED APPLICATIONS

This application is a continuation of U.S. Non-Provisional Pat. Application No. 14/958,584, filed Dec. 3, 2015, which claims the benefit of U.S. Provisional Pat. Application No. 62/087,066, filed Dec. 3, 2014, both of which are incorporated herein by reference.

TECHNICAL FIELD

The present subject matter is generally related to telematics devices, and more particularly, it relates to data science discovering meaningful patterns in telematics data connected with ridesharing.

BACKGROUND

Ridesharing is a modern transportation service that schedules one-time shared rides on very short notice through signaling technology. Unlike carpooling, however, ridesharing is likened to a taxi service, in that its drivers are full or part-time commercial operators making trips for profit, not typical drivers taking additional passengers on social trips they would have made anyway. Ridesharing has generated controversies given its lack of regulation and failure to provide adequate insurance for drivers or their passengers, and not ensuring that its drivers are properly licensed or trained.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One aspect of the present subject matter includes a system form which recites a system comprising a telematics device, the hardware of which records driving data of personal periods and driving data of commercial periods connected with a vehicle. The system further comprises risk pre-scoring hardware, the structure of which calculates a classification of ride sharing perils into distinct classes based on a level of participation in a ride sharing program by the vehicle used during personal periods and commercial periods. The system also comprises audit hardware, the structure of which performs analytics over the driving data of personal periods and the driving data of commercial periods connected with a vehicle to calculate retroactive charges or refunds.

Another aspect of the present subject matter includes a method form which recites a method comprising electronically querying a telematics device for driving data collected in a vehicle; pre-scoring of ridesharing risk based on independent variables extracted from the driving data including driving time, driving distance, and level of participation in ridesharing; electronically querying the telematics device to detect personal periods and commercial periods during which the vehicle was used; and auditing the driving data queried from the telematics device to calculate a refund of insurance charges to insure the vehicle used in ridesharing.

A further aspect of the present subject matter includes a computer-readable medium form which recites a method comprising electronically querying a telematics device for driving data collected in a vehicle; pre-scoring of ridesharing risk based on independent variables extracted from the driving data including driving time, driving distance, and level of participation in ridesharing; electronically querying the telematics device to detect personal periods and commercial periods during which the vehicle was used; and auditing the driving data queried from the telematics device to calculate a refund of insurance charges to insure the vehicle used in ridesharing.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 is a block diagram illustrating an archetypical system with hardware structures executing software and/or hardware logic blocks.

DETAILED DESCRIPTION

Figure 2A:
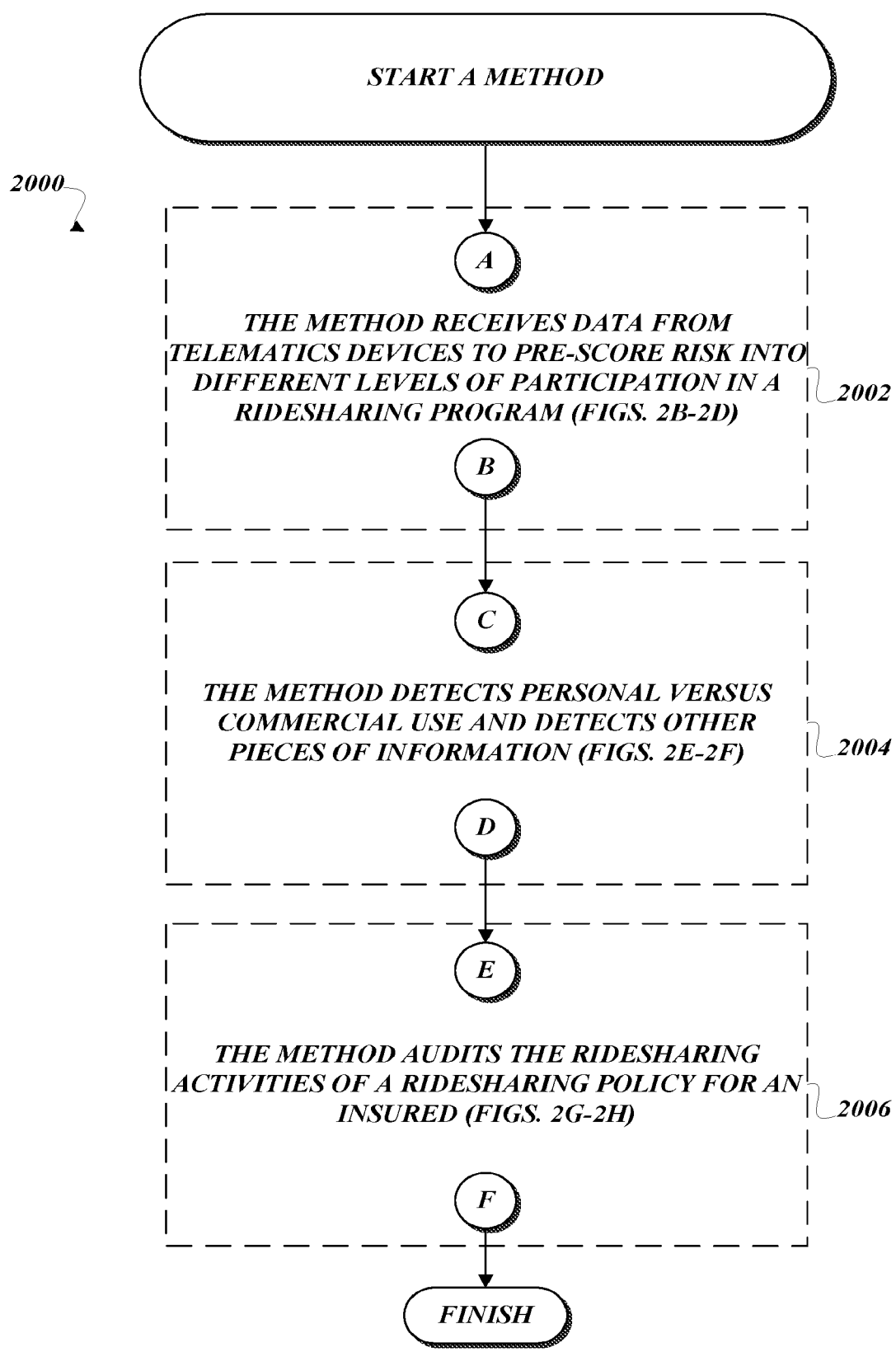
FIGS. 2A-2H are process diagrams implementing an archetypical method useful for improving data science technology.

A system 100 illustrated in FIG. 1 is engineered to facilitate calculation of predicted perils connected with a ride sharing vehicle 102 (or its driver or a ride sharing member) for improving data science technology. Ridesharing drivers in many states are not covered by their personal policy when operating a ridesharing service and are given very minimal commercial coverage by ride sharing operators. The technical solutions of the system 100 facilitate premium endorsement by providing higher coverage than is provided under conventional products and allowing drivers to work directly with their personal lines insurer in reviewing their coverage and filing a claim in the event of an accident. The subject matter facilitates higher limits while including a post-policy period audit that allows a reconciliation of high-use or high-risk driving with appropriate retroactive rate adjustments. The subject matter also facilitates retroactive rate adjustments that would compare a policyholder's time/distance driven or collected telematics data (including time or distance driven in each driving period) to the group average or other historical underwriting data.

Pieces of hardware in the form of an in-vehicle telematics device 104 (such as an OBD II device) and a mobile device 106 (on which a telematics app is executed to transform the mobile device 106 into a specific telematics device) monitor and generate driving data connected with the ride sharing vehicle 102, such as driving time, driving distance, accidents, and so on. The pieces of information generated by the in-vehicle telematics device 104 and the mobile device 106 are presented to risk pre-scoring hardware 108. The risk pre-scoring hardware 108 calculates the probability of ride sharing perils in connection with an estimated level of participation in a ridesharing program by the ridesharing vehicle 102.

The in-vehicle telematics device 104 and the mobile device 106, as well as, various pieces of hardware have hardware structures executing hardware logic or software running on hardware structures implemented using a suitable hardware technology, such as a field-programmable gate array, but any suitable hardware technology can be used in addition to a field-programmable gate array. A field-programmable gate array is a specific computer in the form of an integrated circuit whose hardware is configured after manufacturing, which gives rise to its nomenclature "field-programmable." The field-programmable gate array configuration is specified using a hardware description language (HDL), similar to that used for an application-specific integrated circuit (ASIC). (Circuit diagrams in the past were used to specify the configuration, but this legacy practice is increasingly rare.) Each field-programmable gate array contains an array of programmable hardware logic blocks, and a hierarchy of reconfigurable interconnects that allow the blocks to be physically wired, like many logic gates that can be inter-wired in different configurations. Logic blocks can be configured to perform complex combinational functions or discrete logic gate devices like AND and XOR. In most field-programmable gate arrays, logic blocks also include memory elements, which may be simple flip-flops or more complete blocks of memory.

One hardware logic block of the risk pre-scoring hardware 108 includes a linear predictor block, which is engineered to express $X\beta$ as a linear predictor. This is expressed as a linear combination of parameters $\beta$. More specifically, the linear predictor is the quantity that incorporates the independent variables extracted from the in-vehicle telematics device 104 and the mobile device 106, as well as other databases (not shown), into a ride sharing peril in a ridesharing model. The symbol $\eta$ denotes the linear predictor. It is related to the expected value of the peril through a natural log link function block. More specifically, $\eta$ is expressed as a linear combination of parameters $\beta$. The coefficients of the linear combinations are a matrix of independent variables X. $\eta$ is expressed as $\eta = X\beta$.

The linear predictor block communicates the linear predictor with an overdispersed error gamma probability distribution block. The overdispersed error gamma probability distribution block computes an error probability distribution, suitably, Gamma, whose range includes real numbers from 0 to $+\infty$. The error gamma probability distribution is parameterized by $\theta$ and $\tau$, whose density function f is expressed as follows:

$$f_Y(y|\theta,\tau) = h(y,\tau)\exp\left(\frac{b(\theta)^T T(y) - A(\theta)}{d(\tau)}\right)$$

$\tau$ is the dispersion parameter, is known, and is related to the variance of the distribution. The functions $h(y,\tau)$, $b(\theta)$, $T(y)$, $A(\theta)$, and $d(\tau)$ are known.

The linear predictor block communicates the linear predictor with the natural log link function block. The natural log link function block computationally couples the linear predictor block with the overdispersed error gamma probability distribution block by providing a relationship between the linear predictor and the mean of the error gamma probability distribution. In all embodiments, the inverse canonical relationship is excluded and instead $X\beta = \ln(\mu)$ is suitably included.

Together, the three hardware logic blocks (or software modules executed on pieces of hardware) provide computation to the ridesharing insurance premium server 110, which calculates an expected premium for the driver. The pieces of data or alerts and records from various databases contain patterns of knowledge about the frequency and severity of a peril. The expected losses connected with the peril are solved by solving for the dependent variables, or $\mu$. The outcome of the dependent variables, Y, is generated from the overdispersed error gamma probability distribution block. The mean, $\mu$, of the distribution depends on the independent variables, X, through: $E(Y)=\mu=g^{-1}(X\beta)$ where $E(Y)$ is calculated by the loss pattern analytic hardware 106 to result in the expected value of Y; $X\beta$ is the linear predictor calculated by the linear predictor block; and g is the computation provided by the natural log link function block. In one embodiment, the mean, $\mu$, is solved as $\mu = \exp(X\beta)$.

The information calculated by the risk pre-scoring hardware 108 is presented to the ride sharing insurance premium server 110 where ride sharing premiums are calculated for the ride sharing vehicle 102. Whereas existing coverage for ride sharing provides separate coverage for each predefined driving period (or excludes coverage in certain periods in certain jurisdictions), the ridesharing insurance premium server 110 provides unified premium coverage at all times for the driver. This pre-scoring determines the initial base rate offered for the endorsement. Regarding coverage, full coverage across all ridesharing periods is engineered including first, second, and third periods: the time the driver has the ride sharing application on and is available to provide transportation but has not accepted a ride hailing; the time after the driver has accepted a ride hailing and is traveling to pick up the customer; and the time that the driver is transporting the customer to their destination. The ridesharing insurance premium server 110 formulates the same coverage levels during all three periods and may or may not have a variable premium or refund or chargeback depending on the amount of time spent or miles driven in each period.

The pieces of information generated by the in-vehicle telematics device 104 and the mobile device 106 are also presented to the audit hardware 112. The audit hardware 112 calculates the actual insurance charges to be made to the driver of the ride sharing vehicle 102, which could result in additional insurance charges or refunds. In essence, the audit hardware 112 prorates the endorsement based on the amount of time/distance driven or based on collected telematics data using multivariate rating variables. The audit hardware 112 communicates with the ride sharing insurance premium server 110 to cause an increase or decrease of rate. In particular, this pertains to the amount of time that a driver spends with the telematics device turned off; or the amount of time spent by the driver in the first period; or the amount of time the ride sharing app is turned off in the mobile device, all of which are included in the audit. The information calculated by the audit hardware 112 is presented to an insurer/policy differing hardware 114 where, in the case of multiple insurers and/or insurance policies, a suitable insurer/policy or multiple insurers/policies are triggered.

Figure 2B:
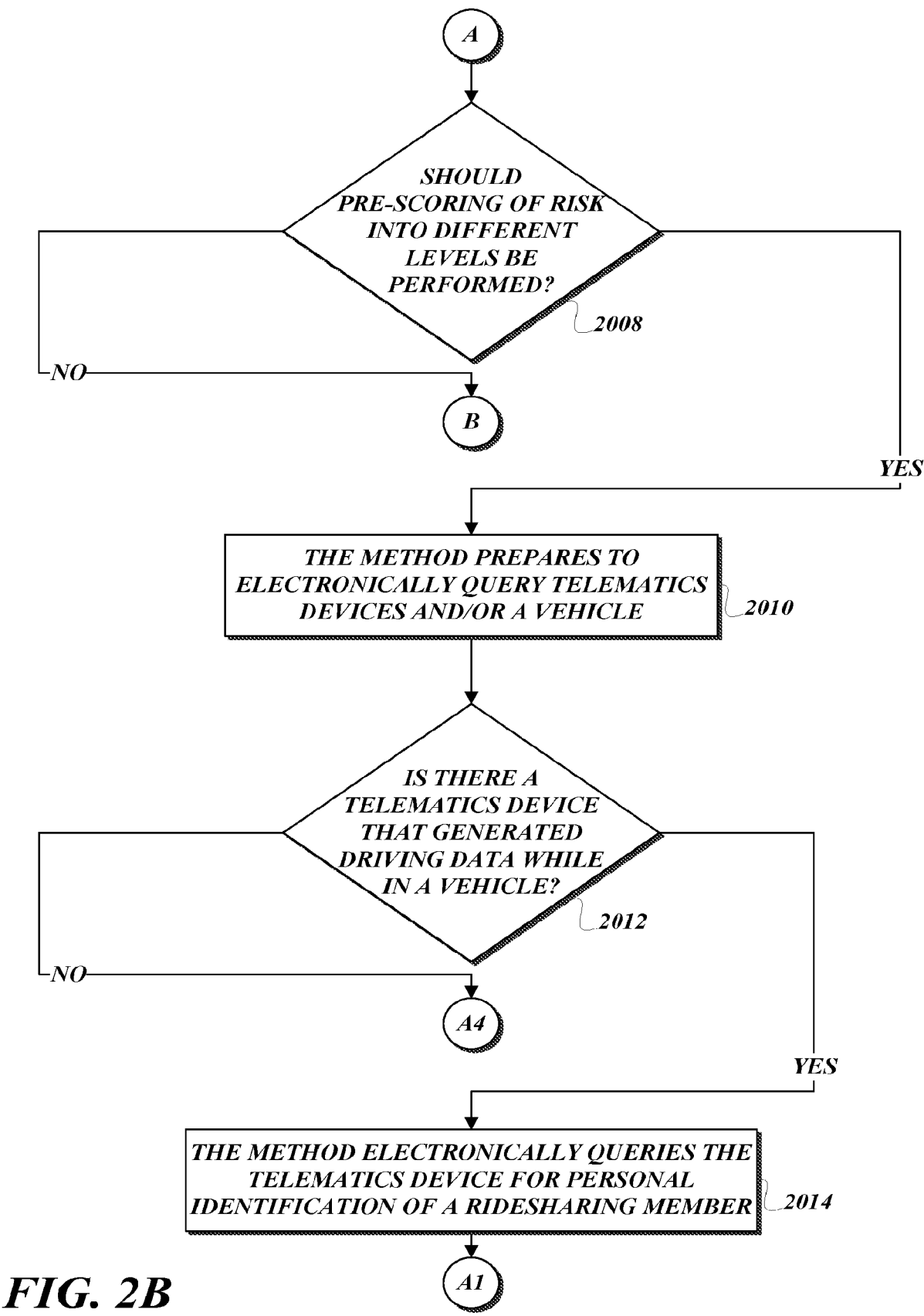
Figure 2C:
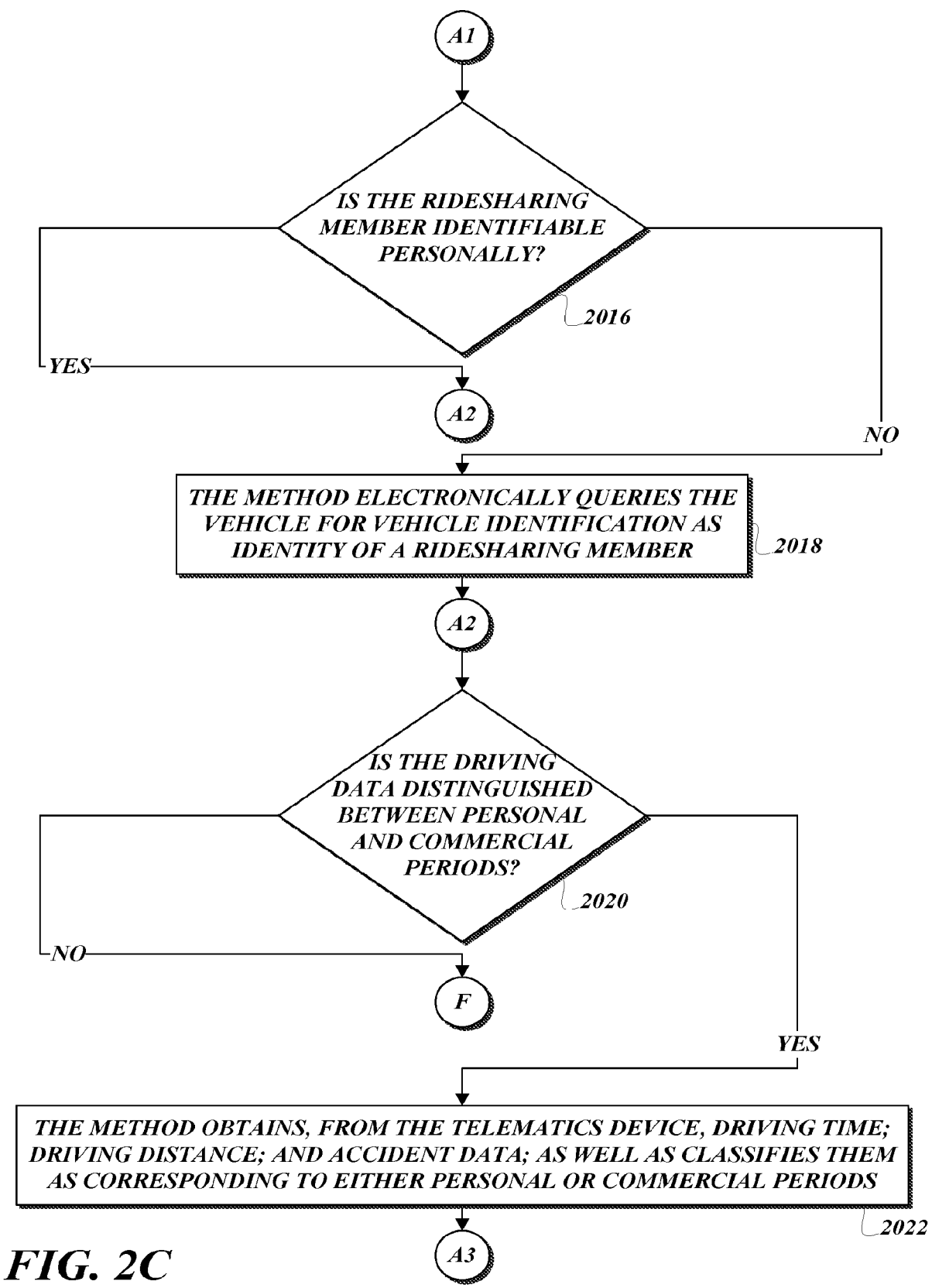
Figure 2D:
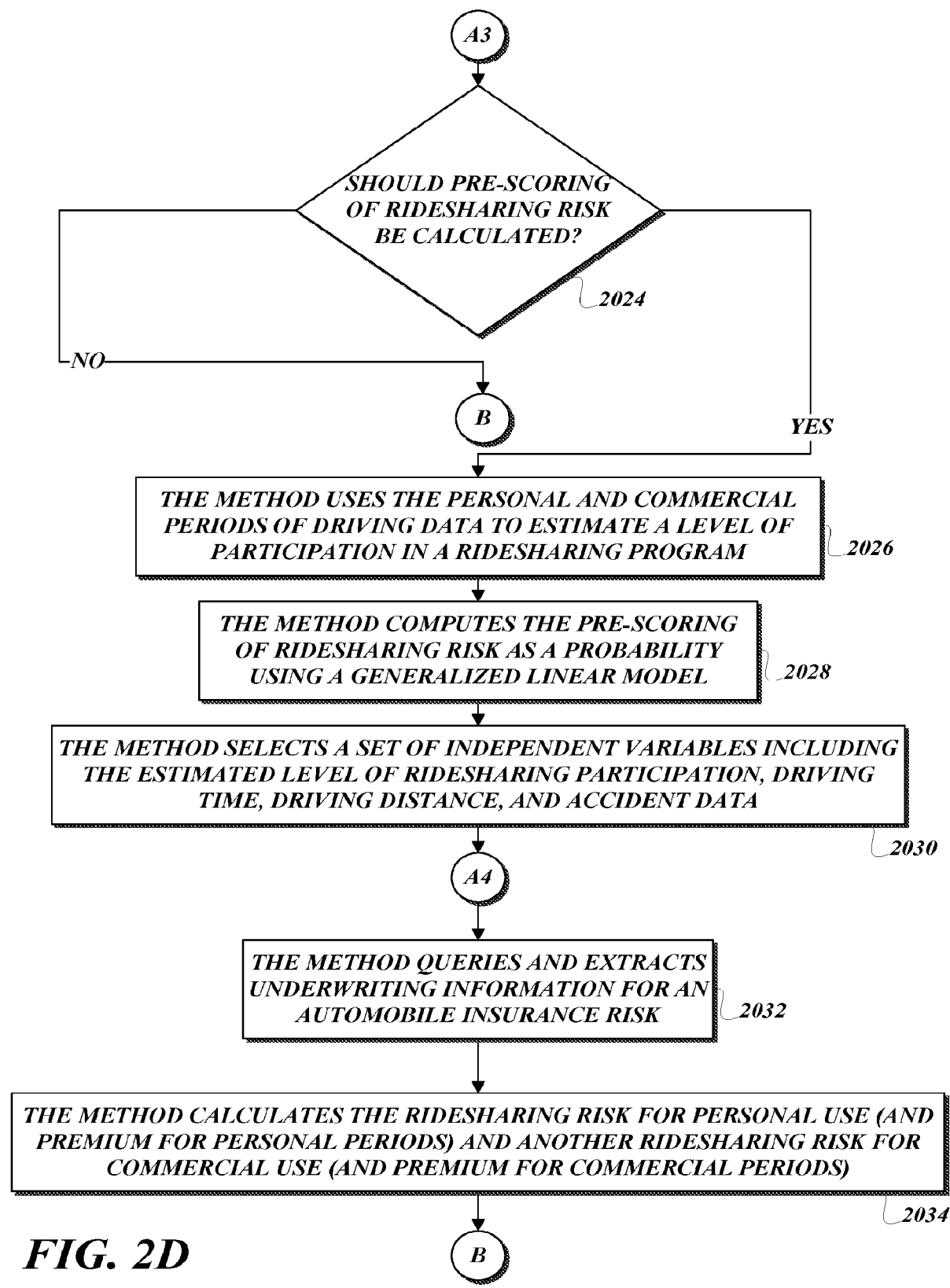
Figure 2E:
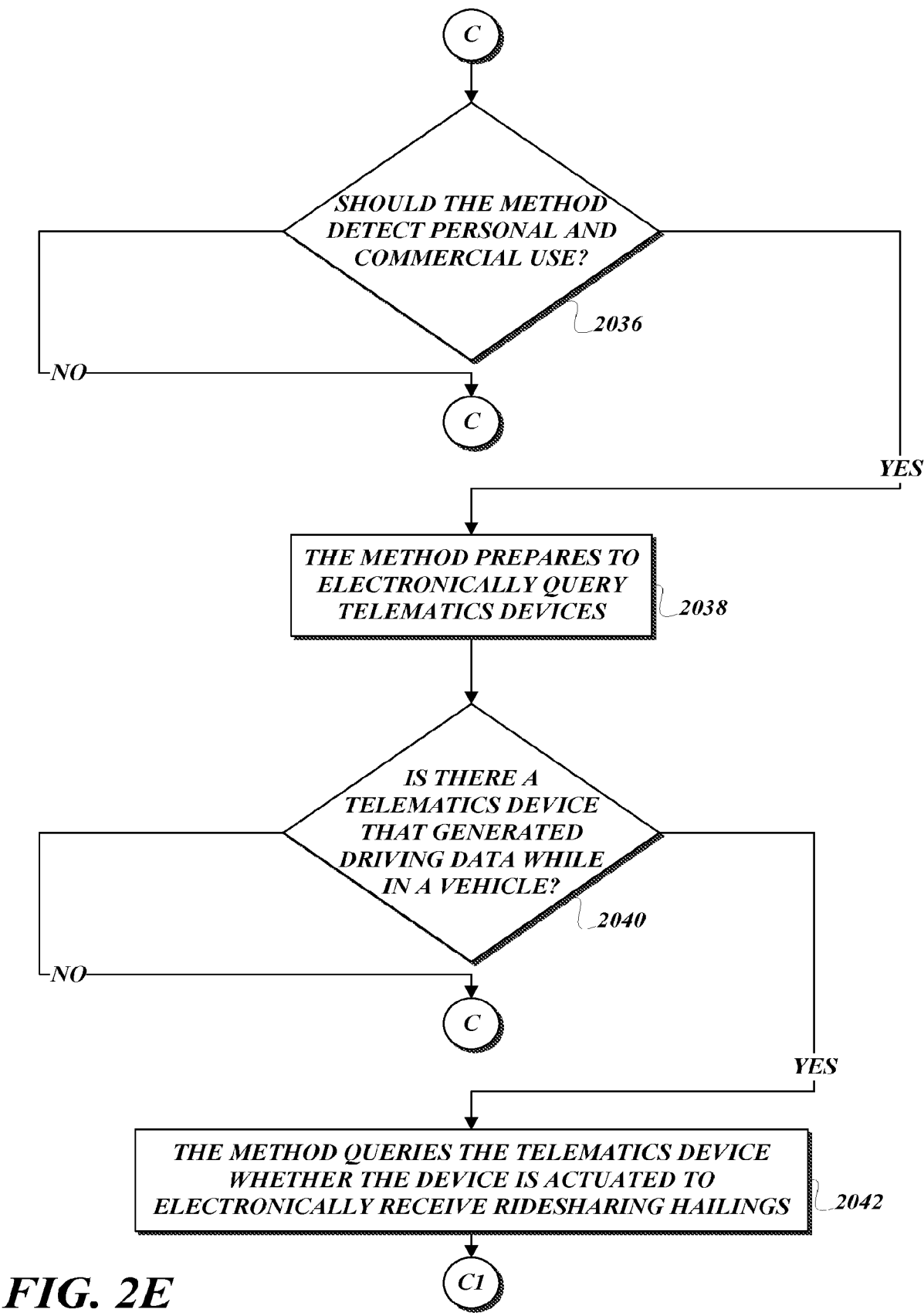
Figure 2F:
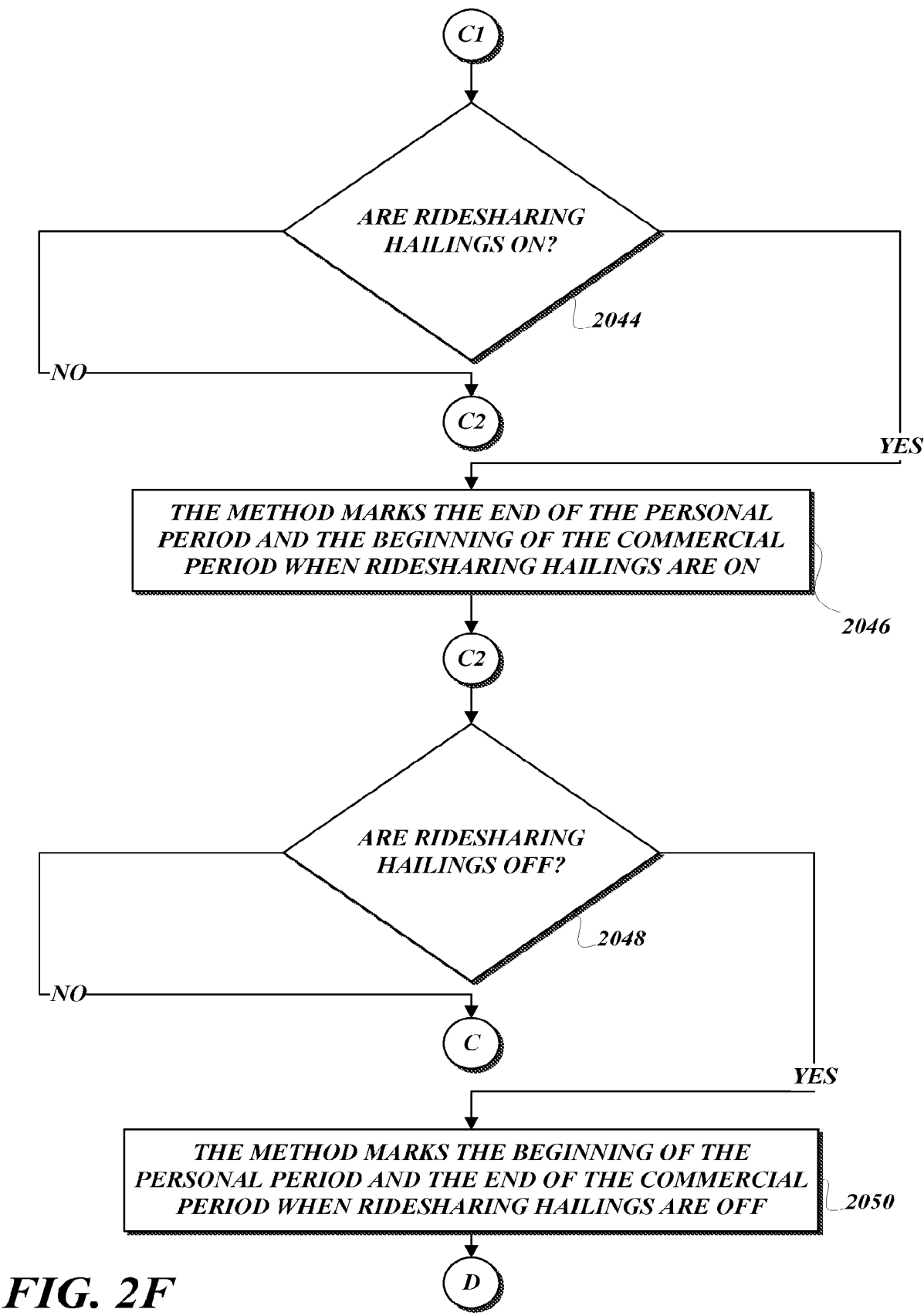
Figure 2G:
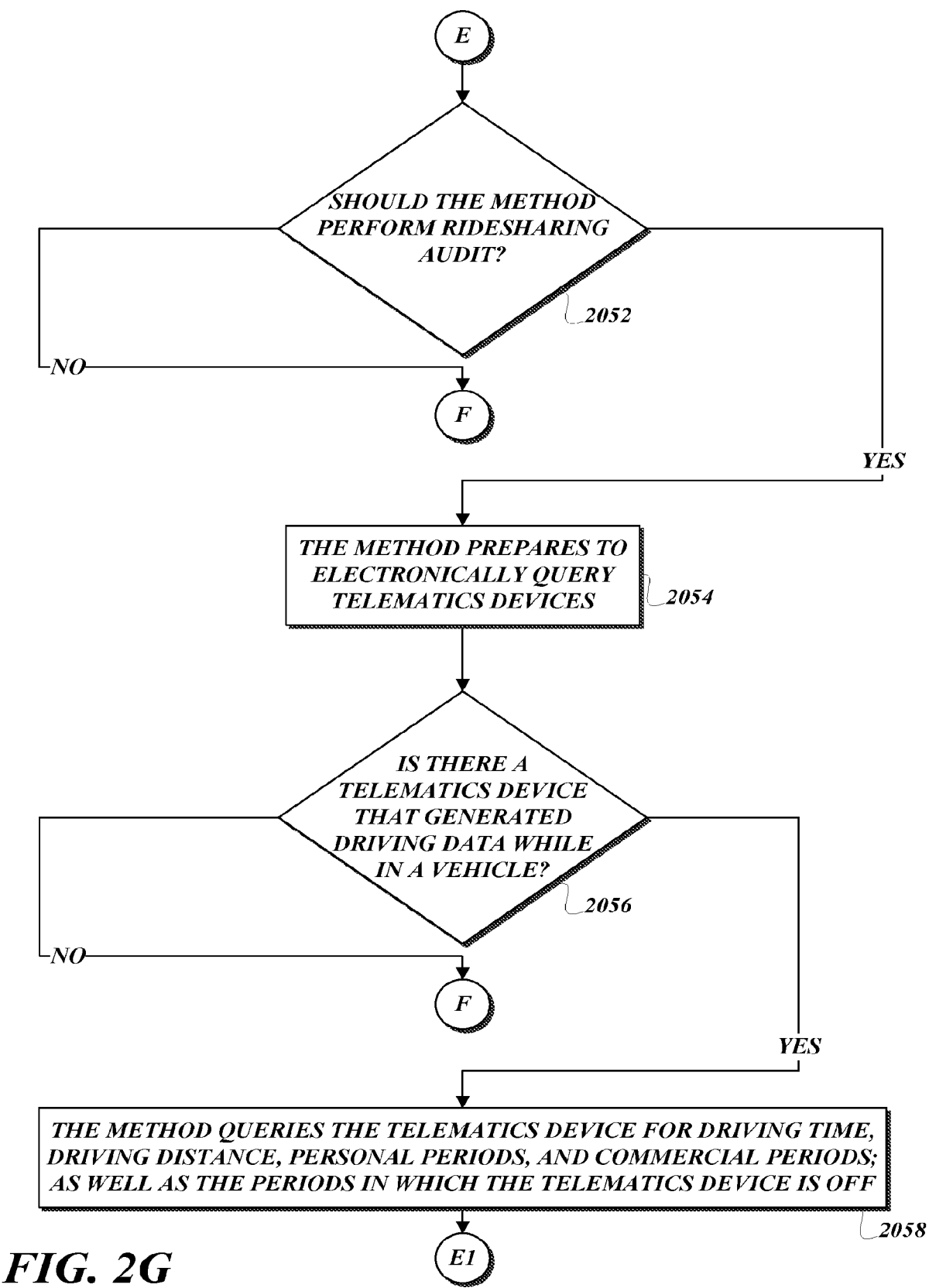
Figure 2H:
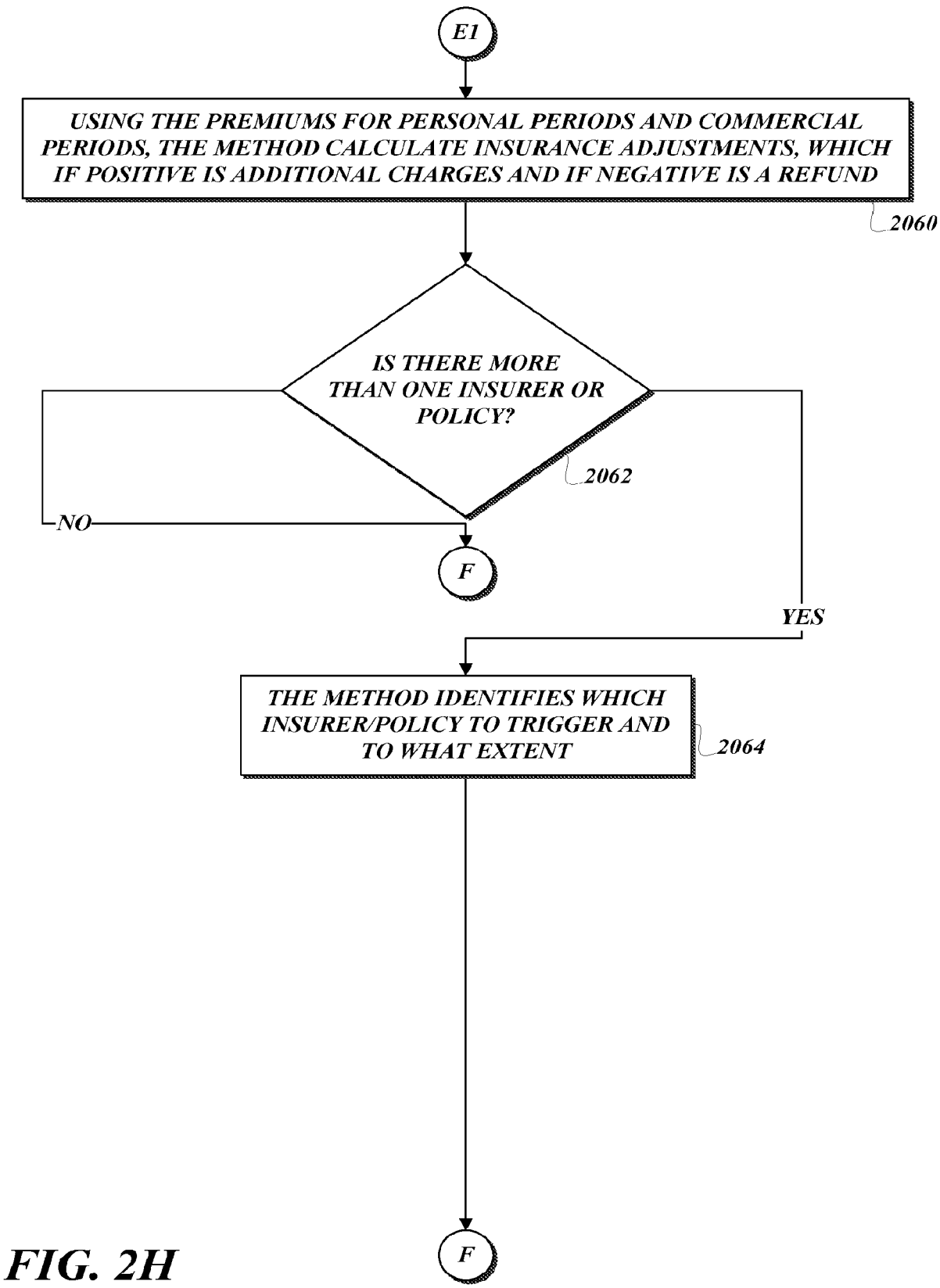

FIGS. 2A-2H are process diagrams implementing an archetypical method 2000 useful for improving data science technology, namely, peril analytics of ride sharing data generated by telematics devices to formulate premium endorsement for driver-participants in a ride sharing program so as to provide better comprehensive coverage of a personally insured ridesharing driver-participant. From the start block, the method 2000 proceeds to a set of method steps 2002, defined between a continuation terminal ("terminal A") and another continuation terminal ("terminal B"). The set of method steps 2002 receives data from telematics devices to pre-score risk into different levels of participation in a ride sharing program. From terminal A (FIG. 2B), the method 2000 proceeds to decision block 2008 where a test is performed to determine whether pre-scoring of risk into different levels is to be performed. If the answer to the test at decision block 2008 is No, the method proceeds to terminal B. Otherwise, if the answer to the test at decision block 2008 is Yes, the method proceeds to block 2010 where the method prepares to electronically query telematics devices and/or a vehicle. The method then continues to decision block 2012 where another test is performed to determine whether there is a telematics device that generated driving data while in a vehicle. If the answer to the test at decision block 2012 is No, the method proceeds to another continuation termination ("terminal A4"). Otherwise, if the answer to the test at decision block 2012 is Yes, the method proceeds to block 2014 where the method electronically queries the telematics device for personal identification of a ride sharing member. The purpose of this step is to facilitate identification of ride sharing program participants by comparing a unique customer or vehicle identifier (such as Social Security Numbers or other personal indicia, or Vehicle Identification Numbers or other vehicle indicia, or both) provided by the prospect at the time of an automobile insurance quote, which is saved to a database of enrolled or active participants provided by ridesharing providers or through a third-party company that has access to information about users' membership in the transportation network carrier. The method then continues to another continuation terminal ("terminal A1").

From terminal A1 (FIG. 2C), the method proceeds to decision block 2016 where a test is performed to determine whether the ride sharing member is identifiable personally. If the answer to the test at decision block 2016 is Yes, the method continues to another continuation terminal ("terminal A2"). Otherwise, if the answer to the test at decision block 2016 is No, the method proceeds to block 2018 where the method electronically queries the vehicle for vehicle identification as substitute identity of a ridesharing member. The method then continues to terminal A2. From terminal A2 (FIG. 2C), the method 2000 proceeds to decision block 2020 where another test is performed to determine whether the driving data is distinguished between personal and commercial periods. If the answer to the test at decision block 2020 is No, the method continues to another continuation terminal ("terminal F") and terminates execution. Otherwise, if the answer to the test at decision block 2020 is Yes, the method proceeds to block 2022 where the method obtains, from the telematics device, driving time; driving distance; and accident data; as well as classifying them (driving time; driving distance; and accident data) as occurring during either personal or commercial periods. The method then continues to another continuation terminal ("terminal A3").

From terminal A3 (FIG. 2D), the method 2000 proceeds to decision block 2024 where a test is performed to determine whether pre-scoring of ridesharing risk should be calculated. If the answer to the test at decision block 2024 is No, the method proceeds to terminal B. Otherwise, if the answer to the test at decision block 2024 is Yes, the method proceeds to block 2026 where the method uses the personal and commercial periods of driving data to estimate a level of participation in a ridesharing program. For example, if ten percent of the driving time is personal and ninety percent of the driving time is commercial, the method calculates a higher level of ridesharing participation, such as ninety percent or another higher level that is calculated from normalization. The method then continues to block 2028 where the method computes the pre-scoring of ride sharing risk as a probability using a generalized linear model. At block 2030, the method selects a set of independent variables including the estimated level of ride sharing participation, driving time, driving distance, and accident data. The method then continues to another continuation terminal, terminal A4. From terminal A4 (FIG. 2D), the method proceeds to block 2032 where the method queries and extracts underwriting information for an automobile insurance risk.

At block 2034, the method calculates the ride sharing risk for personal use (and premium for personal periods) and another ride sharing risk for commercial use (and premium for commercial periods). In various embodiments, the method subsidizes the cost of the ride sharing insurance service for eligible prospects. The insurer may work with ridesharing companies to subsidize the cost of the insurance endorsement or offer an increased driving compensation rate for participation in the ride sharing service. The peril analytics of ridesharing data facilitates premium endorsements to provide higher coverage than can be provided under either personal insurance or commercial insurance alone and allows insured drivers to work directly with a personal lines insurer in reviewing their coverage and filing a claim in the event of an accident. The method then continues to terminal B.

From terminal B (FIG. 2A), the method 2000 proceeds to a set of method steps 2004 defined between a continuation terminal ("terminal C") and another continuation terminal ("terminal D"). The set of method steps 2004 detects personal versus commercial use and detects other pieces of information. From terminal C (FIG. 2E), the method 2000 proceeds to decision block 2036 where a test is performed to determine whether the method detects personal or commercial use. If the answer to the test at decision block 2036 is No, the method proceeds to terminal C and skips back to decision block 2036 where its execution is again repeated. Otherwise, if the answer to the test at decision block 2036 is Yes, the method proceeds to block 2038 where the method prepares to electronically query telematics devices. The method 2000 proceeds to decision block 2040 where another test is performed to determine whether there is a telematics device that generated driving data while in a vehicle. If the answer to the test at decision block 2040 is No, the method proceeds to terminal C and skips back to decision block 2036 where its execution is again repeated. Otherwise, if the answer to the test at decision block 2040 is Yes, the method proceeds to block 2042 where the method queries the telematics device regarding whether the device is actuated to electronically receive ridesharing hailings. The method then continues to another continuation terminal ("terminal C1").

From terminal C1 (FIG. 2F), the method 2000 proceeds to decision block 2044 where a test is performed to determine whether the ridesharing hailing receiver is on. If the answer to the test at decision block 2044 is No, the method proceeds to another continuation terminal ("terminal C2"). Otherwise, if the answer to the test at decision block 2044 is Yes, the method enters block 2046 where the method marks the end of the personal period and the beginning of the commercial period when the ride sharing hailing receiver is on. The method proceeds to terminal C2. From terminal C2 (FIG. 2F), the method then continues to decision block 2048 where a test is performed to determine whether the ride sharing hailing receiver is off. If the answer to the test at decision block 2048 is No, the method proceeds to terminal C and skips back to decision block 2036 where its processing is again repeated. Otherwise, if the answer to the test at decision block 2048 is Yes, the method proceeds to block 2050 where the method marks the beginning of the personal period and the end of the commercial period when the ride sharing hailing receiver is off. The method then continues to terminal D.

From terminal D (FIG. 2A), the method 2000 proceeds to a set of method steps 2006 defined between a continuation terminal ("terminal E") and another continuation terminal ("terminal F"). The set of method steps 2006 audits the ridesharing activities of a ride sharing policy for an insured. From terminal E (FIG. 2G), the method proceeds to decision block 2052 where a test is performed to determine whether the method performs a ride sharing audit. If the answer to the test at decision block 2052 is No, the method proceeds to terminal F and terminates execution. Otherwise, if the answer to the test at decision block 2052 is Yes, the method proceeds to block 2054 where the method prepares to electronically query telematics devices. The method then continues to another decision block 2056 where another test is performed to determine whether there is a telematics device that generated driving data while in a vehicle. If the answer to the test at decision block 2056 is No, the method proceeds to terminal F and terminates execution. Otherwise, if the answer to the test at decision block 2056 is Yes, the method proceeds to block 2058 where the method queries the telematics device for driving time, driving distance, personal periods, and commercial periods; as well as the periods in which the telematics device is turned off. The method then continues to another continuation terminal ("terminal E1").

From terminal E1 (FIG. 2H), the method 2000 proceeds to block 2060 where using the premiums for personal periods and commercial periods, the method calculates insurance adjustments, which if positive result in additional insurance charges to the insured (or driver) and if negative result in a refund being provided to the insured. The method then continues to another decision block 2062 where a test is performed to determine whether there is more than one insurer or policy. If the answer to the test at decision block 2062 is No, the method proceeds to terminal F and terminates execution. Otherwise, if the answer to the test at decision block 2062 is Yes, the method proceeds to block 2064 where the method identifies which insurer/policy to trigger and to what extent. The method uses identification information culled from the telematics device to identify whether an insurer/policy is in either a primary or excess capacity. The method then continues to terminal F and terminates execution.

While illustrative embodiments have been illustrated and described, it will be appreciated that various changes can be made therein without departing from the spirit and scope of the invention.

The embodiments of the invention in which an exclusive property or privilege is claimed are defined as follows:

1. A reconciliation system comprising risk pre-scoring hardware operating in parallel with audit hardware, at least one processor, at least one memory, and a non-transitory computer-readable medium, the reconciliation system configured to:
   by the risk pre-scoring hardware:
      receive driving data for a vehicle via at least a telematics device affixed to or installed in the vehicle, wherein the driving data comprises at least one of driving distances or driving times;
      receive status information of a ridesharing application operative on the telematics device, the status information based on at least whether a ridesharing receiver of the telematics device is on or off;
      from the driving data and the status information of the ridesharing application, identify:
         (a) first driving data for the vehicle, wherein the first driving data (i) is related to a first driving segment of a plurality of driving segments in which the ridesharing receiver is off, the ridesharing application operative on the telematics device is not actuated to electronically receive ridesharing requests, or the ridesharing application operative on the telematics device indicates no ride ridesharing requests have been accepted, (ii) comprises an indication of at least one of a first distance or first time driven during the first driving segment, and (iii) comprises an indication of a first time associated with the first driving segment,
         (b) second driving data for the vehicle, wherein the second driving data (i) is related to a second driving segment of the plurality of driving segments in which the ridesharing receiver is on, and the ridesharing application operative on the telematics device indicates an accepted ride ridesharing request but the vehicle has not yet begun transporting a ridesharing customer associated with the ridesharing request, (ii) comprises an indication of at least one of a second distance or second time driven during the second driving segment, and (iii) comprises an indication of a second time associated with the second driving segment, and
         (c) third driving data for the vehicle, wherein the third driving data (i) is related to a third driving segment of the plurality of driving segments in which the ridesharing receiving is on, and the ridesharing application operative on the telematics device indicates the vehicle is transporting the ridesharing customer, (ii) comprises an indication of at least one of a third distance or third time driven during the third driving segment, and (iii) comprises an indication of a third time associated with the third driving segment;
      for each of the plurality of driving segments, programmatically generate a risk score based at least in part on the corresponding distance driven and the corresponding time;
   by the audit hardware:
      programmatically perform an audit of a first coverage for the vehicle based at least in part on the first driving data and the corresponding risk score and the second driving data and the corresponding risk score, wherein performing the audit comprises one or more of (i) calculating a refund of zero, or (ii) calculating additional insurance charges;
      programmatically perform an audit of a second coverage for the vehicle based at least in part on the second driving data and the corresponding risk score and the third driving data and the corresponding risk score, wherein performing the audit comprises one or more of (i) calculating a refund of zero, or (ii) calculating additional insurance charges; and
      provide for display, by a user interface, of an indication of one or more of (a) the audit of the first coverage for the vehicle or (b) the audit of the second coverage for the vehicle.

2. The system of claim 1, wherein the reconciliation system is further configured to:
   by the audit hardware:
      receive an indication of at least one selected coverage for the vehicle.

3. The system of claim 2, wherein the reconciliation system is further configured to:
   by the audit hardware:
      programmatically determine a prorated amount corresponding to the at least one selected coverage and subsequently increase or decrease the prorated amount.

4. The system of claim 2, wherein the reconciliation system is further configured to:

by the risk pre-scoring hardware:
  programmatically determine, based at least in part on the driving data, a level of participation of the vehicle in a ridesharing service.

5. The system of claim 4, wherein the at least one selected coverage further comprises compensation for the level of participation in the ridesharing service.

6. The system of claim 1, wherein at least one of the first coverage and the second coverage comprises a single full insurance coverage cost for the vehicle.

7. The system of claim 1, wherein one or more of the audit of the first coverage and the audit of the second coverage is based at least in part on accident data corresponding with at least one of the plurality of driving segments.

8. A method implemented by a reconciliation system comprising risk pre-scoring hardware operating in parallel with audit hardware, one or more processors, at least one memory, and a non-transitory computer-readable medium, the method comprising:
  by the risk pre-scoring hardware of the reconciliation system:
    receiving, by the one or more processors, driving data for a vehicle via at least a telematics device affixed to or installed in the vehicle, wherein the driving data comprises at least one of driving distances or driving times;
    receiving status information of a ridesharing application operative on the telematics device, the status information based on at least whether a ridesharing receiver of the telematics device is on or off;
    from the driving data and the status information of the ridesharing application, identifying, by the one or more processors:
      (a) first driving data for the vehicle, wherein the first driving data (i) is related to a first driving segment of a plurality of driving segments in which the ridesharing receiver is off, the ridesharing application operative on the telematics device is not actuated to electronically receive ridesharing requests, or the ridesharing application operative on the telematics device indicates no ride ridesharing requests have been accepted, (ii) comprises an indication of a first distance driven during the first driving segment, and (iii) comprises an indication of a first time associated with the first driving segment,
      (b) second driving data for the vehicle, wherein the second driving data (i) is related to a second driving segment of the plurality of driving segments in which the ridesharing receiver is on, and the ridesharing application operative on the telematics device indicates an accepted ride ridesharing request but the vehicle has not yet begun transporting a ridesharing customer associated with the ridesharing request, (ii) comprises an indication of a second distance driven during the second driving segment, and (iii) comprises an indication of a second time associated with the second driving segment, and
      (c) third driving data for the vehicle, wherein the third driving data (i) is related to a third driving segment of the plurality of driving segments in which the ridesharing receiving is on, and the ridesharing application operative on the telematics device indicates the vehicle is transporting the ridesharing customer, (ii) comprises an indication of a third distance driven during the third driving segment, and (iii) comprises an indication of a third time associated with the third driving segment;
    for each of the plurality of driving segments, programmatically generating, by the one or more processors, a risk score based at least in part on the corresponding distance driven and the corresponding time;
  by the audit hardware of the reconciliation system:
    programmatically performing, by the one or more processors, an audit of a first coverage for the vehicle based at least in part on the first driving data and the corresponding risk score and the second driving data and the corresponding risk score, wherein performing the audit comprises one or more of (i) calculating a refund of zero, or (ii) calculating additional insurance charges;
    programmatically performing, by the one or more processors, an audit of a second coverage for the vehicle based at least in part on the second driving data and the corresponding risk score and the third driving data and the corresponding risk score, wherein performing the audit comprises one or more of (i) calculating a refund of zero, or (ii) calculating additional insurance charges; and
    provide for display, by the one or more processors and by a user interface, of an indication of one or more of (a) the audit of the first coverage for the vehicle or (b) the audit of the second coverage for the vehicle.

9. The method of claim 8, further comprising:
  by the audit hardware:
    receiving, by the one or more processors, an indication of at least one selected coverage for the vehicle.

10. The method of claim 9, further comprising:
  by the audit hardware:
    programmatically determining, by the one or more processors, a prorated amount corresponding to the at least one selected coverage and subsequently increasing or decreasing the prorated amount.

11. The method of claim 9, further comprising:
  by the risk pre-scoring hardware:
    programmatically determining, by the one or more processors and based at least in part on the driving data, a level of participation of the vehicle in a ridesharing service.

12. The method of claim 11, further comprising:
  by the audit hardware:
    programmatically determining, by the one or more processors, a compensation for the level of participation in the ridesharing service.

13. The method of claim 8, further comprising:
  by the audit hardware:
    programmatically determining, by the one or more processors, a single full insurance coverage cost for the vehicle.

14. The method of claim 8, wherein programmatically determining, by the one or more processors, the audit of the first coverage and the audit of the second coverage is based at least in part on accident data corresponding with at least one of the plurality of driving segments.

15. A non-transitory computer-readable medium having stored thereon computer-executable instructions, the computer-executable instructions which when executed by at least one processor of a reconciliation system comprising risk pre-scoring hardware operating in parallel with audit hardware, cause the reconciliation system at least to:
  by the risk pre-scoring hardware:
    receive driving data for a vehicle via at least a telematics device affixed to or installed in the vehicle, wherein the driving data comprises at least one of driving distances or driving times;

receive status information of a ridesharing application operative on the telematics device, the status information based on at least whether a ridesharing receiver of the telematics device is on or off;

from the driving data and the status information of the ridesharing application, identify:

(a) first driving data for the vehicle, wherein the first driving data (i) is related to a first driving segment of a plurality of driving segments in which the ridesharing receiver is off, the ridesharing application operative on the telematics device is not actuated to electronically receive ridesharing requests, or the ridesharing application operative on the telematics device indicates no ride ridesharing requests have been accepted, (ii) comprises an indication of a first distance driven during the first driving segment, and (iii) comprises an indication of a first time associated with the first driving segment, (b) second driving data for the vehicle, wherein the second driving data (i) is related to a second driving segment of the plurality of driving segments in which the ridesharing receiver is on, the ridesharing application operative on the telematics device indicates an accepted ride ridesharing request but the vehicle has not yet begun transporting a ridesharing customer associated with the ridesharing request, (ii) comprises an indication of a second distance driven during the second driving segment, and (iii) comprises an indication of a second time associated with the second driving segment, and (c) third driving data for the vehicle, wherein the third driving data (i) is related to a third driving segment of the plurality of driving segments in which the ridesharing receiver is on, and the ridesharing application operative on the telematics device indicates the vehicle is transporting the ridesharing customer, (ii) comprises an indication of a third distance driven during the third driving segment, and (iii) comprises an indication of a third time associated with the third driving segment;

for each of the plurality of driving segments, programmatically generate a risk score based at least in part on the corresponding distance driven and the corresponding time;

by the audit hardware:

programmatically perform an audit of a first coverage for the vehicle based at least in part on the first driving data and the corresponding risk score and the second driving data and the corresponding risk score, wherein performing the audit comprises one or more of (i) calculating a refund of zero, or (ii) calculating additional insurance charges;

programmatically perform an audit of a second coverage for the vehicle based at least in part on the second driving data and the corresponding risk score and the third driving data and the corresponding risk score, wherein performing the audit comprises one or more of (i) calculating a refund of zero, or (ii) calculating additional insurance charges; and provide for display, by a user interface, of an indication of one or more of (a) the audit of the first coverage for the vehicle or (b) the audit of the second coverage for the vehicle.

16. The non-transitory computer-readable medium of claim 15, wherein the computer-executable instructions when executed by the at least one processor, further cause the reconciliation system to:

by the audit hardware:

receive an indication of at least one selected coverage for the vehicle.

17. The non-transitory computer-readable medium of claim 16, wherein the computer-executable instructions when executed by the at least one processor, further cause the reconciliation system to:

by the audit hardware:

programmatically determine a prorated amount corresponding to the at least one selected coverage and subsequently increase or decrease the prorated amount.

18. The non-transitory computer-readable medium of claim 16, wherein the computer-executable instructions when executed by the at least one processor further cause the reconciliation system to:

by the risk pre-scoring hardware:

programmatically determine, based at least in part on the driving data, a level of participation of the vehicle in a ridesharing service.

19. The non-transitory computer-readable medium of claim 18, wherein the at least one selected coverage further comprises compensation for the level of participation in the ridesharing service.

20. The non-transitory computer-readable medium of claim 15, wherein at least one of the first coverage and the second coverage comprises a single full insurance coverage cost for the vehicle.

\* \* \* \* \*